United States Patent
Nguyen et al.

(10) Patent No.: US 10,567,999 B2
(45) Date of Patent: Feb. 18, 2020

(54) CLUSTERING IN UNIFIED COMMUNICATION AND COLLABORATION SERVICES

(71) Applicant: ShoreTel, Inc., Sunnyvale, CA (US)

(72) Inventors: Hoang Long Nguyen, Santa Clara, CA (US); Asim Parekh, San Ramon, CA (US)

(73) Assignee: Mitel Networks, Inc. DE (US)

( * ) Notice: Subject to any disclaimer, the term of this patent is extended or adjusted under 35 U.S.C. 154(b) by 117 days.

(21) Appl. No.: 15/703,910

(22) Filed: Sep. 13, 2017

(65) Prior Publication Data

US 2019/0082353 A1    Mar. 14, 2019

(51) Int. Cl.
| | |
|---|---|
| H04W 28/08 | (2009.01) |
| G06F 9/50 | (2006.01) |
| H04W 72/04 | (2009.01) |
| H04L 29/08 | (2006.01) |

(52) U.S. Cl.
CPC .......... *H04W 28/08* (2013.01); *G06F 9/5083* (2013.01); *H04L 67/1002* (2013.01); *H04L 67/1044* (2013.01); *H04L 67/1097* (2013.01); *H04W 72/048* (2013.01); *G06F 9/5061* (2013.01); *H04W 72/0486* (2013.01)

(58) Field of Classification Search
CPC .............................. G06F 9/5083; G06F 9/5061
See application file for complete search history.

(56) References Cited

U.S. PATENT DOCUMENTS

| | | |
|---|---|---|
| 2007/0174660 A1 | 7/2007 | Peddada |
| 2014/0019626 A1 | 1/2014 | Hubler et al. |
| 2015/0254143 A1* | 9/2015 | Onishi ............... G06F 11/1451 714/19 |
| 2018/0192327 A1* | 7/2018 | Gaydos ............... H04W 28/08 |

OTHER PUBLICATIONS

Adams, Routing Network Traffic to Stateful Services in Service Fabric, Nov. 2, 2016, Accessed Online on Aug. 31, 2017, https://www.opsgility.com/blog/2016/11/02/routing-network-traffic-to-stateful-services-in-service-fabric/.
Basics of scaling Java EE applications (Thinking in Java EE (or at least trying to!)), Oct. 19, 2015, Accessed On: Aug. 31, 2017, https://abhirockzz.wordpress.com/2015/10/19/basics-of-scaling-java-ee-applications/.
Making the Case for Building Scalable Stateful Services In The Modern Era, High Scalability, Oct. 12, 2015, Accessed Online on Aug. 31, 2017, http://highscalability.com/blog/2015/10/12/making-the-case-for-building-scalable-stateful-services-in-t.html.

* cited by examiner

*Primary Examiner* — Saumit Shah (57) ABSTRACT

A method for telecommunications is disclosed herein including a first node receiving a plurality of events. A first state machine in the first node generates a current state of the first state machine by processing the plurality of events. The first node publishes the plurality of events to a persistent event log. A second node subscribes to the persistent event log. A second state machine in the second node generates the current state of the first state machine on the second state machine by processing the plurality of events from the persistent event log.

18 Claims, 7 Drawing Sheets

CLUSTERING IN UNIFIED COMMUNICATION AND COLLABORATION SERVICES

BACKGROUND

"Unified communication" (UC) services or unified communications and collaboration services (UCC) describe a cloud-based integration of real-time, enterprise-wide communication services (e.g., instant messaging, presence information, voice, mobility features, audio, web & video conferencing, fixed-mobile convergence, desktop sharing, data sharing, call control, and speech recognition) with non-real-time communication services (e.g., unified messaging, integrated voicemail, e-mail, SMS and fax). UC services are not necessarily provided by a single product or vendor, but typically by a set of products that provide a consistent unified user-interface and user-experience across multiple user devices and media-types. Thus, UC services can encompass all forms of communications that are exchanged via a network or multiple connected networks, whether directed as one-to-one communications or multicast/broadcast communications from one to many. In other words, UC services allow a user to send and receive the same type of communications on a variety of different media. For example, the user can receive a voicemail message and choose to access it through e-mail, a cell phone or another medium. Additionally, if the sender is online and currently accepts calls, a response to the voicemail can be sent immediately through yet another medium, such as text chat or video call. Otherwise, the response may be sent as a non-real-time message that can be accessed through a variety of media. These UC services are typically provided via a cloud-based system in order to enhance the ability to integrate, update, modify and manage the various types of communication services.

Traditional legacy systems have significant challenges in terms of their scalability and redundancy characteristics for providing UCC or UC services. For example, such systems only provide for discrete hardware nodes at different locations and, if failure of a single node occurs, the entire system could stop working. Also, the limited feature set and networking capabilities of these systems restrict the amount of available expansion and user mobility. The enormous level of complexity of such legacy systems, combined with the cumbersome hardware requirements, makes them costly to own and maintain and undesirable for a modern IT environment. Conventional solutions are stateless "micro-services" in which the client submits enough information in each request to the server application for the server application to service the request, so that the server application does not have to maintain data after servicing each request. That approach has drawbacks for organizations maintaining existing software engineered around a complex hierarchy of interdependent state machines. It may require significant rewrite of a codebase that has been developed and maintained over years and in turn, incur a drop of performance of one to two orders of magnitude.

SUMMARY

A method for telecommunications is disclosed herein including a first node receiving a plurality of events. A first state machine in the first node generates a current state of the first state machine by processing the plurality of events. The first node publishes the plurality of events to a persistent event log. A second node subscribes to the persistent event log. A second state machine in the second node generates the current state of the first state machine on the second state machine by processing the plurality of events from the persistent event log.

A system for telecommunications is disclosed herein and includes a router configured to receive a plurality of events. The plurality of events is associated with a customer. A plurality of cluster nodes having a first cluster node of the plurality of cluster nodes is associated with the customer. The first cluster node has a first state machine and an internal message bus, and is configured to receive the plurality of events from the router based on the customer, generate, by the first state machine, a current state of the first state machine by processing the plurality of events, and publish, by the first cluster node, the plurality of events to a persistent event log. An external message bus is in communication with the plurality of cluster nodes and has the persistent event log. A coordinator in communication with the plurality of cluster nodes is configured to transmit a message to a second cluster node of the plurality of cluster nodes. When the second cluster node receives a message from the coordinator, the second cluster node subscribes to the persistent event log via the external message bus and generates the current state of the first state machine on a second state machine by processing the plurality of events from the persistent event log.

A method for telecommunications is also disclosed herein and includes a router receiving a plurality of events. The plurality of events is associated with a customer. A router transmits the plurality of events. A first node associated with the customer receives the plurality of events based on the customer. The first node is part of a plurality of cluster nodes and has a first state machine and an internal message bus. The first state machine generates a current state of the first state machine by processing the plurality of events. The first node publishes the plurality of events to an persistent event log. A second node receives a message directing the second node to subscribe to the persistent event log. The second node subscribes to the persistent event log. The second node receives the plurality of events from the persistent event log. A second state machine in the second node generates the current state of the first state machine on the second state machine by processing the plurality of events from the persistent event log.

The plurality of events is for a communication service including at least one of an instant message, presence information, voice features, mobility features, audio features, web and video conferencing, calendaring, fixed-mobile convergence, desktop sharing, data sharing, call control, speech recognition, unified messaging, integrated voicemail, e-mail, SMS or fax.

The first node is associated with at least one customer. The first node and the second node are part of a cluster of nodes and communicate with a coordinator and an external message bus. The external message bus has the persistent event log. The processing of the plurality of events from the persistent event log is associated with a customer. The plurality of events is processed by the first node in an order received. The plurality of events is processed by the second node in a same order as the first node so that the second state machine recreates the same state as the first state machine. In some embodiments, the first node operates using a revision of software and the second node operates using a different revision of the same software. The first node and the second node operate at the same time in the system.

In some embodiments, the method further includes the router receiving the plurality of events from the at least one customer. The plurality of events may be associated with the at least one customer. The router transmits the plurality of events to the first node associated with the at least one customer.

The method further includes the second node receiving a message from a coordinator directing the second node to subscribe to the persistent event log. The second node subscribes to the persistent event log when the first node fails to communicate with a coordinator or when the first node reaches a set capacity.

In some embodiments, the method further includes the second node subscribing to the persistent event log while the first node is processing the plurality of events. A second state machine in the second node generates on the second state machine in the second node, the current state of the first state machine in the first node by processing the plurality of events from the persistent event log. A duplicate of the entire first node is created in case of a failure of the first node.

DETAILED DESCRIPTION

Unified communication (UC) services or unified communications and collaboration services (UCC) describe a cloud-based integration of real-time, enterprise-wide communication services with non-real-time communication services.

Conventionally, stateless configurations are used which have dynamic routing and flexibility when handling incoming requests or events for communication sessions from client devices associated with customers (or "tenants"). In this way, a load balancer assesses the traffic and capacity of nodes then routes the event to any available node. This routing is performed at the message level and no information or previous knowledge of the ongoing communication session is known by the server. Thus, the client device also has to send enough information in the event for the server to realize the state for each event, or the session of which the event is a part. This need for detailed information multiplies the network traffic by five to tenfold using more bandwidth and adds strain on the stateless system with a higher cost for the network and processing. Also, more hardware is required in a stateless configuration system than in a stateful or "new stateful cluster node system". When the node in a stateless system receives the events, the state needs to be calculated for every event from data provided by a client device, and typically, databases are accessed to gather further necessary information to process the event. The session information or status or "state" of the session following the event is not retained after processing each event. Stateless systems are scaled by adding nodes.

The present application uses a new stateful cluster node system configuration that networks or clusters the nodes and that does not require the larger hardware, network traffic, processing, and bandwidth requirements described above for stateless systems, yet is capable of being scaled up to handle more customers or growth of an individual customer. This stateful cluster node system and method thus enables legacy systems using stateful configurations to make evolutionary changes without spending years, resources or energy to write the code and build the new system. Other improvements and/or advantages will also be described below or become apparent from the following disclosure.

This new stateful cluster node system allows the customer (e.g., an enterprise, entity, or business organization) to be associated with a particular node (or "cluster node"), so that information is maintained at the node for ongoing communication sessions for users or client devices associated with the customer. Therefore, when an event is received from a client device, the event is automatically routed to the node associated with the customer, based on a minimum amount of data in the event that identifies the customer. Compared to a stateless system, this decreases or eliminates at least some of the communication needed between the customer and service, the communication between the service and database, the computation by the service to determine the state of the session for the event, and the determination of how to respond to the event.

In a non-limiting example to demonstrate the difference between a stateless system, e.g., a conventional system, and the new stateful cluster node system, e.g., the present application, the customer requests to create a user within the system. In a stateless system, the client device of the customer sends the event to the system with complete information of the request of creating the user and includes many details, such as a complete identifying profile of the user, such as name, address, phone number, employer, etc. The stateless server receives this event, determines if the needed information is present, calculates the state, then responds. In contrast, in the new stateful cluster node system, the client device of the customer sends the event associated with the customer to the system with no information other than the request of creating the user associated with the customer. The server receives this event, and automatically routes the event to the node associated with the customer.

Figure 1:
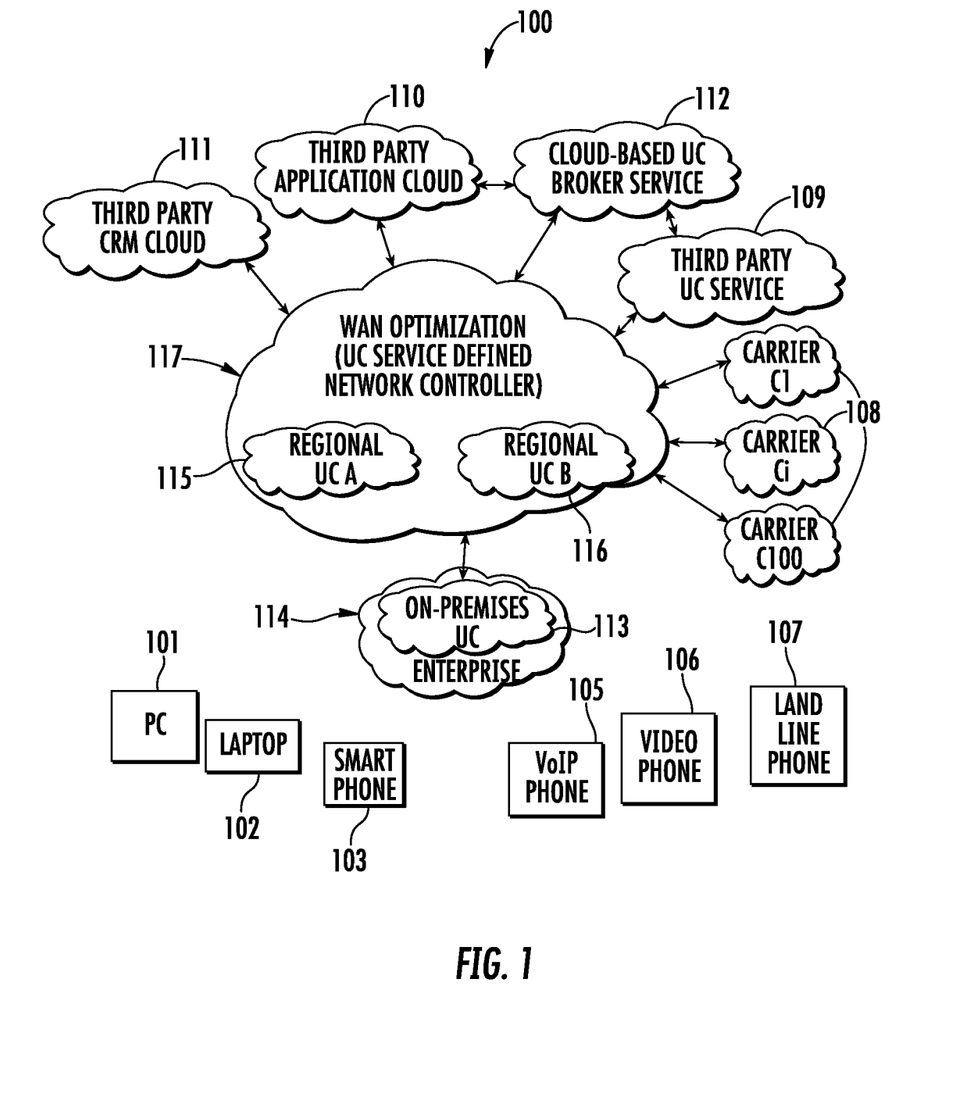
FIG. 1 is a simplified schematic of an example unified communication (UC) system or unified communications and collaboration (UCC) network system, in accordance with some embodiments.

FIG. 1 is a simplified schematic of an example unified communication (UC) system or unified communications and collaboration (UCC) network system (the "communication network system") 100, in accordance with some embodiments, with which users communicate with each other using a variety of communication devices (e.g., personal computers (PC) 101, laptop computers 102, smartphones 103, voice over Internet protocol (VoIP) phones 105, video phones 106, land line phones 107, smart watches, smart cars, etc.). The communication devices 101-107 generally transmit and receive communication data through a variety of paths or communication access systems, e.g., a variety of carriers 108 for telephone services, third-party UC service systems 109, third-party application cloud systems 110, third-party customer relationship management (CRM) cloud systems 111, cloud-based UC broker service systems 112 (e.g., to facilitate integration of different communication services), and customer on-premises UC systems 113 of various enterprises 114, among other potential systems. The communication access systems 108-113 generally communicate through multiple geographic regional UC systems, e.g., regional UC A 115 and regional UC B 116, of a UC "service defined network" controller, or wide area network (WAN) optimization system 117, for UC services. The WAN optimization system 117 enables UC as a service (UCaaS) functionality for quality of service (QoS) provisioning and communication management between data centers having software defined networks (SDNs) for the multiple regional UCs 115 and 116 and the on-premises UC systems 113 having SDNs.

The WAN optimization system 117 is, thus, a UC service system that incorporates UC services deployed across multiple different clouds, yet supports a proper network QoS over the Internet. Additionally, service-level agreements (SLA) for the UC services in this situation can be guaranteed. Furthermore, since many UC services use a SDN for (low-level) "flow-level" control and management of communications, the WAN optimization system 117 enables the UC services to be provided across multiple geographic regional systems with convenient provisioning and control of the communications at the flow-level for each of the many end users of the UC services within the multiple geographical regions. Additionally, although some network elements that may be used within the regional systems might not support SDN, the WAN optimization system 117 further enables easy integration of these network elements with other network elements that operate with SDNs. The WAN optimization system 117 can, therefore, implement, install, manage and maintain a large, complex UC service system across multiple regions for many different enterprises.

In accordance with the description herein, the various illustrated components of the communication network system 100 generally represent appropriate hardware and software components for providing the described resources and performing the described functions. The hardware generally includes any appropriate number and combination of computing devices, network communication devices, and peripheral components connected together, including various processors, computer memory (including transitory and non-transitory media), input/output devices, user interface devices, communication adapters, communication channels, etc. The software generally includes any appropriate number and combination of conventional and specially-developed software with computer-readable instructions stored by the computer memory in non-transitory computer-readable or machine-readable media and executed by the various processors to perform the functions described herein.

The WAN optimization system 117 manages the regional UCs 115 and 116 through secure channels (e.g., virtual private networks (VPN)) and provides integration with, and APIs for, the third-party UC service systems 109, the third-party application cloud systems 110, the third-party CRM cloud systems 111, and the cloud-based UC broker service systems 112. The WAN optimization system 117, thus, operates at a level that is higher than, or above, the SDN controllers and other network management protocols, e.g. Network Configuration Protocol (Netconf) and command line interface (CLI), of the regional UCs 115 and 116 and the on-premises UC systems 113. In this configuration, the WAN optimization system 117 provides a benefit of accelerating UC applications, improving backup times, and optimizing bandwidth for integrated hybrid UC services for the enterprises 114 and their individual users. QoS provisioning and monitoring are provided by a unified communications region-based service level application program interface (API) of the WAN optimization system 117, e.g., a representational state transfer (REST) API, rather than by a flow-level API of the SDNs. The end-to-end QoS provisioning is reserved based on demand for UC services, system management, and database synchronization purposes. Additionally, with this configuration, the UC services can be managed in such a manner that a user or customer pays only for the UC services that are used by that user or customer. Furthermore, in some embodiments, both active-active and active-standby modes are supported with geographical redundancy and disaster recovery (GR/DR) support.

The WAN optimization system 117 generally translates UC service level or layer requests to SDN flow-level configurations, Netconf configurations, or CLI configurations based on information regarding the available UC services and the various regional UCs 115 and 116. The WAN optimization system 117 (e.g., by an analytics module) is also configured to collect operation and performance statistics from the various network elements and components for each end-to-end UC service provided to customers and to map the results to the UC service level. The WAN optimization system 117 also correlates status and event data from the various SDN controllers and other management protocols to the status of the UC service level. Additionally, the WAN optimization system 117 provides a web-based North Bound Interface (NBI) function to a UC resource manager for service integration.

The WAN optimization system 117, thus, serves as an over-layered high-level transport network for integrated hybrid UC services in a multiple-cloud architecture among multiple countries and/or geographic regions (e.g., for the geographic regional UCs 115/116) with multiple enterprises 114 (e.g. tenants and/or customers), multiple carriers 108, and multiple third-party UC service systems 109. Also, the WAN optimization system 117 coordinates and manages cloud-based UC services, customer on-premises UC services, and hybrid (cloud and on-premises) UC services in each country or region (e.g., for the regional UCs 115/116). Additionally, the WAN optimization system 117 can handle communication traffic for any of the end-point communication devices 101-107. Furthermore, the WAN optimization system 117 provides easy integration with the third-party CRM cloud systems 111 and APIs (e.g., through API gateways) for the third-party application cloud systems 110.

Figure 2:
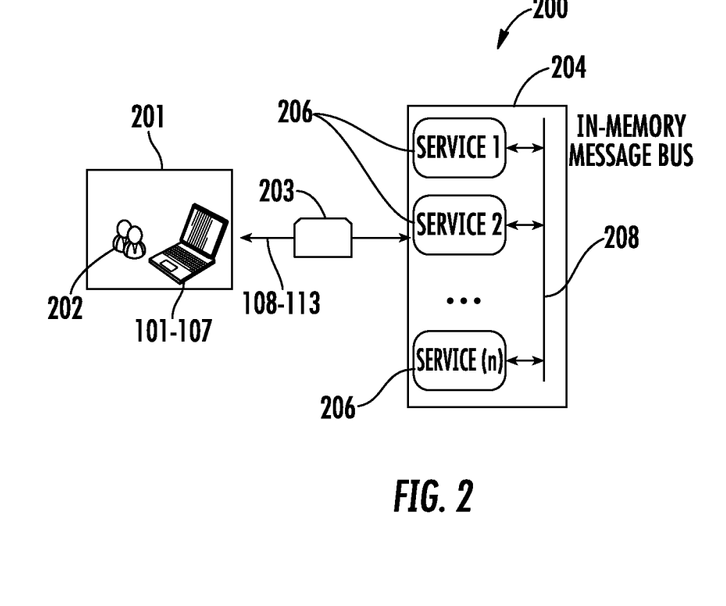
FIG. 2 depicts a simplified schematic of a portion of a unified communication network system, in accordance with some embodiments.

FIG. 2 depicts a simplified schematic of a portion of a unified communication network system 200 (e.g., similar to the communication network system 100), in accordance with some embodiments. The unified communication network system 200 generally includes at least one communication device (e.g., 101-107) operated by at least one user 202, a router 203, and a cluster node 204, among other components not shown for simplicity. In some embodiments, the cluster node 204 and the router 203 are (or are part of) the on-premises UC system 113 or the regional UCs 115 and 116. In some embodiments, the cluster node 204 is associated with one or more customers 201, e.g., the enterprise 114 or other entity or business organization. The cluster node 204, thus, provides communication services for the customer 201. The cluster node 204 represents an N+1 clustering for software systems based on complex hierarchical and interdependent state machines. Additionally, the user 202 is associated with the same customer 201, e.g., as an employee, contractor, owner, etc. The communication device 101-107 is also associated with the customer 201.

The user 202 participates in user communication sessions with other people, communication devices, or resources via the communication device 101-107. For a communication session, the communication device 101-107 generates or issues requests or events and transmits them to the router 203, which routes them to the cluster node 204. The requests or events are communication service events, telecommunication software or hardware events, software or hardware events for managing telecommunication sessions, and/or software or hardware events for a communication service. For example, the event includes at least one of an instant message, presence information, voice features, mobility features, audio features, web and video conferencing, calendaring, fixed-mobile convergence, desktop sharing, data sharing, call control, speech recognition, unified messaging, integrated voicemail, e-mail, SMS or fax.

Each event is received by the router 203, which may be a semi-static router 203, and which identifies the customer 201 and, thus, the cluster node 204 associated with the customer 201. The router 203 transmits the event to the identified cluster node 204 through any appropriate portion of the communication access systems 108-113, depending on how the user 202 and the communication device 101-107 is connected into the overall unified communication network system 200. The system 200 uses the cluster node 204 which includes a plurality of server processes or a plurality of services 206. There may be any appropriate number of the services 206 as are needed to provide the desired services, e.g., at least one service 206 or up to one hundred or more services 206 in one node. Within the cluster node 204, the events are provided to the appropriate service 206 that handles the type of the event, e.g., a voice phone call, an email, etc. The service 206 processes the event. An internal message bus 208 (internal to the cluster node 204) provides a communication architecture that is instantiated in a local memory storage within the cluster node 204. For example, the service 206 uses the internal message bus 208 to communicate within the cluster node 204 with other services 206 enabling events to be exchanged over the internal message bus 208 for optimal performance.

Figure 3:
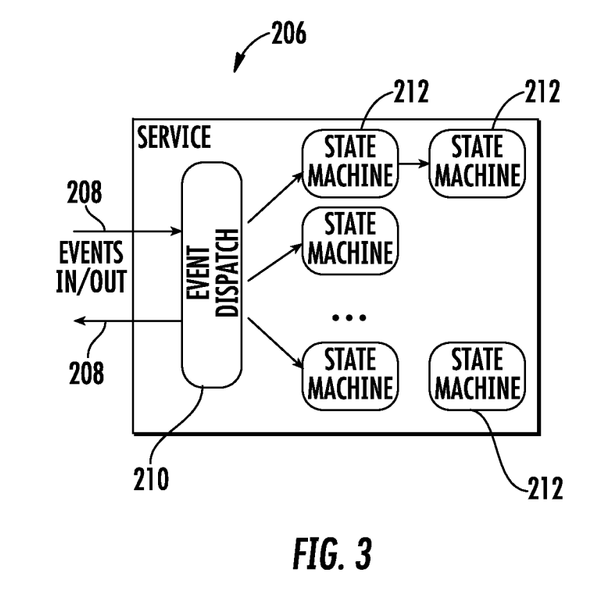
FIG. 3 depicts a simplified schematic of a service in the cluster node of the unified communication network system, in accordance with some embodiments.

FIG. 3 depicts a simplified schematic of a service 206 in the cluster node 204 of the unified communication network system 200, in accordance with some embodiments. The service 206 generally includes an event dispatcher 210 and a plurality of state machines 212, among other elements not shown for simplicity. When the event or the plurality of events is received by the cluster node 204, it is routed via the internal message bus 208 to the appropriate service or services 206 within the cluster node 204 based on the type of events. In the service 206, the dispatcher 210 routes the events to the appropriate state machine 212 or state machines 212 and the events are processed by the state machines 212. The state of the state machines 212 in the service 206 may be saved to the internal message bus 208 or other appropriate data storage.

Figure 4:
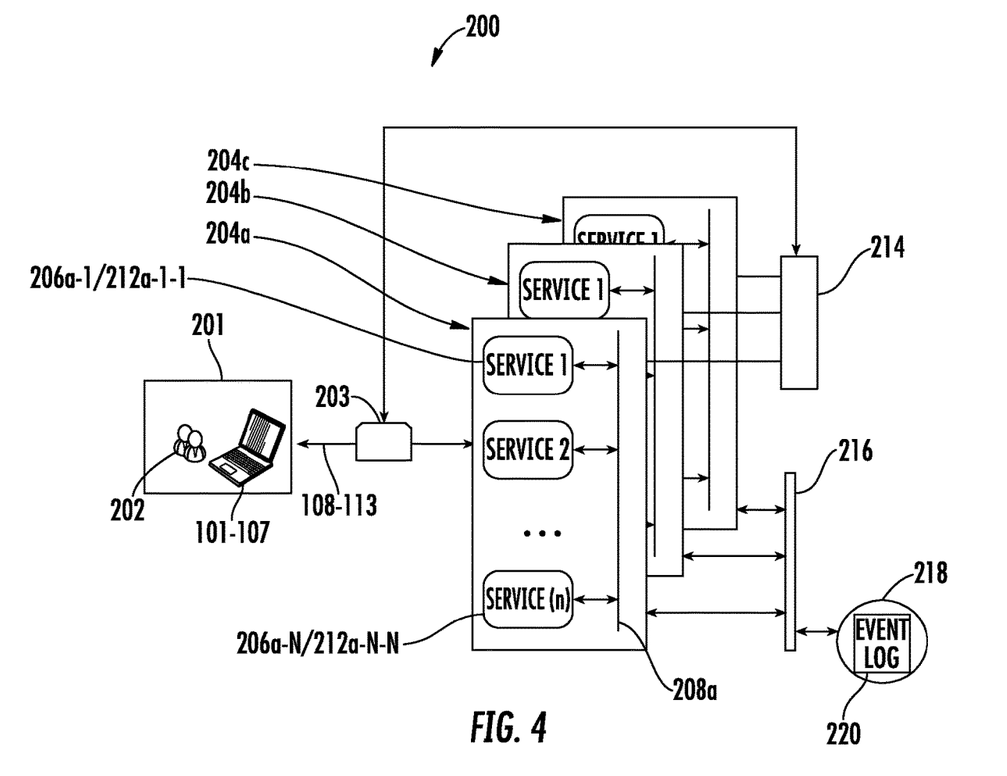
FIG. 4 is a simplified schematic of a portion of the unified communication network system, in accordance with some embodiments.

The cluster node 204 may be networked with other cluster nodes 204 to create a group or network of cluster nodes. FIG. 4 is a simplified schematic of a portion of the unified communication network system 200, in accordance with some embodiments. Networking the cluster nodes 204a-c, with no single point of failure, enables the software system to implement or process multiple events which behaves as a single application with a larger amount of capacity.

In some embodiments, the cluster node 204 is associated with at least one customer 201 and therefore, assigned to a particular customer 201. The user 202 associated with the customer 201 transmits an event or a plurality of events, which may be referred to as 'event' for simplicity. The router 203 is configured to receive the event and the event is associated with the particular customer 201, e.g., by identifying the user 202 or the customer 201 or both. Upon determining the associated customer 201, the router 203 directs the event associated with the customer 201 to a first cluster node 204a associated with the same customer 201. The first cluster node 204a is part of a plurality of cluster nodes. In this way, events are automatically and quickly routed to the cluster node 204 based on the customer 201, or at a customer level. In conventional systems with multiple nodes, by comparison, the event is routed at a message level. For example, in a conventional system, the event contains a lot of information for the server to realize and calculate the state for each event. The event is then received typically by a load balancer and the load balancer assesses the current load and capacity of the nodes then transmits the event to an available node without regard to the customer. This process wastes time and resources to determine the state and which node is available to process the event. Routing events at the customer level as in the present system is less resource intensive, faster and more efficient than routing events at the message level as in conventional systems, because once the node 204 is assigned to a particular customer 201, the event is merely routed to that node without further use of time, resources or calculations.

As shown in FIGS. 2 and 3, the cluster nodes 204 include the plurality of services 206 with the state machines 212 and the internal message bus 208. Additionally, the internal message bus 208 of each cluster node 204 communicates with a coordinator 214, as shown in FIG. 4. The coordinator 214 monitors the cluster nodes 204 and also communicates with the router 203 in order to ensure that the nodes 204 in the cluster have a consistent view of themselves and of the entire cluster. An external message bus 216 with persistent storage 218 is also included in the unified communication network system 200. The external message bus 216 with persistent storage 218 is outside of or external from the cluster nodes 204 and is a communication architecture for communication with the cluster nodes 204. The external message bus 216 operates as a distributed service with no single point of failure and provides/ensures event persistence. The persistent storage 218 saves a persistent event log 220 which is external to the nodes of the events processed by the state machines 212 in the cluster nodes 204. The persistent event log 220 may be organized by customer 201 or cluster node 204.

Figure 5:
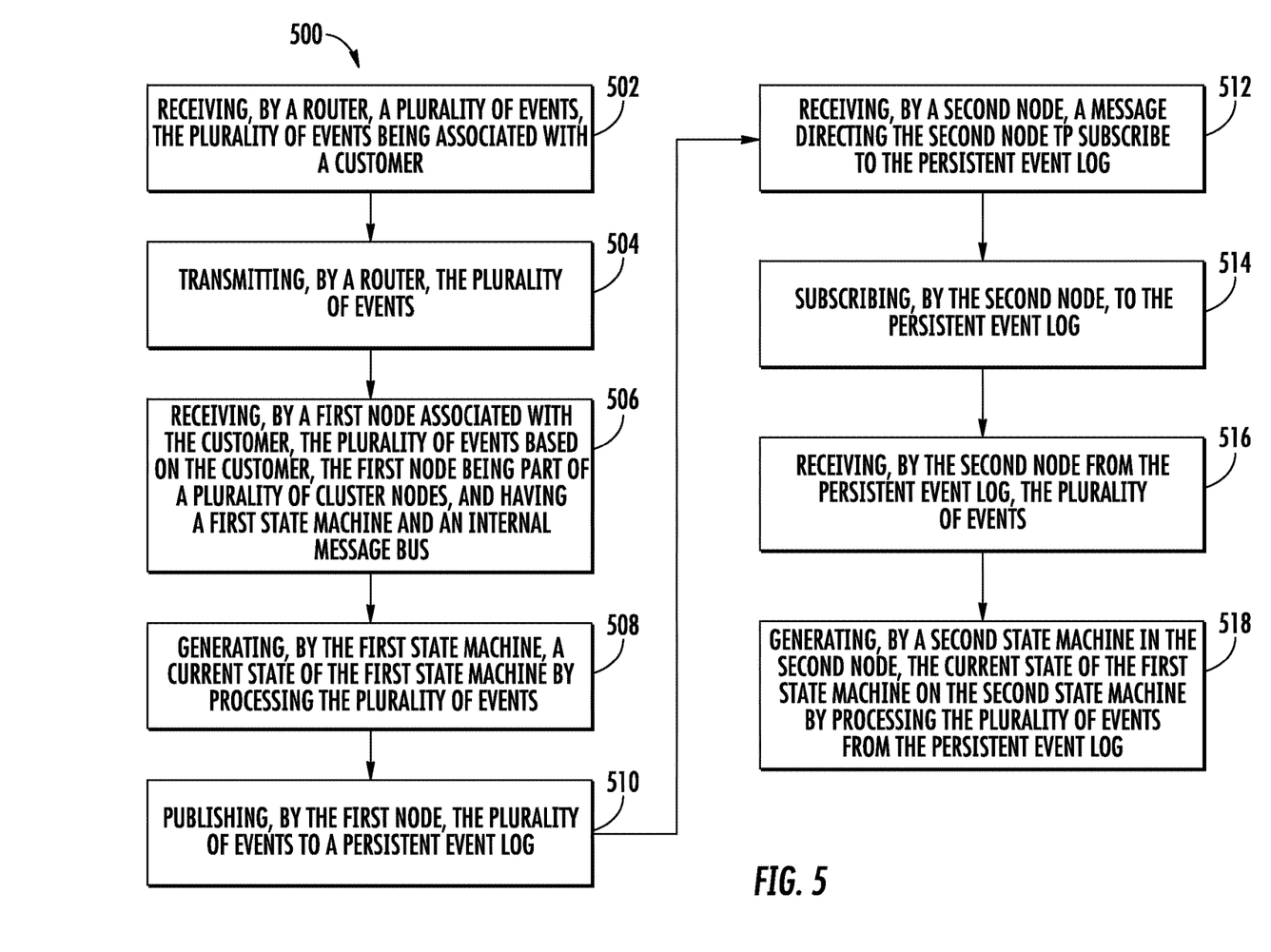
FIG. 5 illustrates a telecommunication method 500 using the unified communication network system, in accordance with some embodiments.

FIG. 5 illustrates a telecommunication method 500 using the unified communication network system 200 in accordance with some embodiments. At step 502, the router 203 receives the plurality of events for a communication session from at least one customer 201, typically one at a time in the order in which the events occur. The plurality of events is associated with the at least one customer 201, as well as with at least one of the users 202 involved in the communication session. The plurality of events are telecommunication software or hardware events, software or hardware events for managing telecommunication sessions, or software or hardware events for a communication service. This may be, for example, a call to a call center involving events, such as placing the call, receiving the call, establishing a communication channel, ending the call, ending the communication channel, etc.

Figure 6:
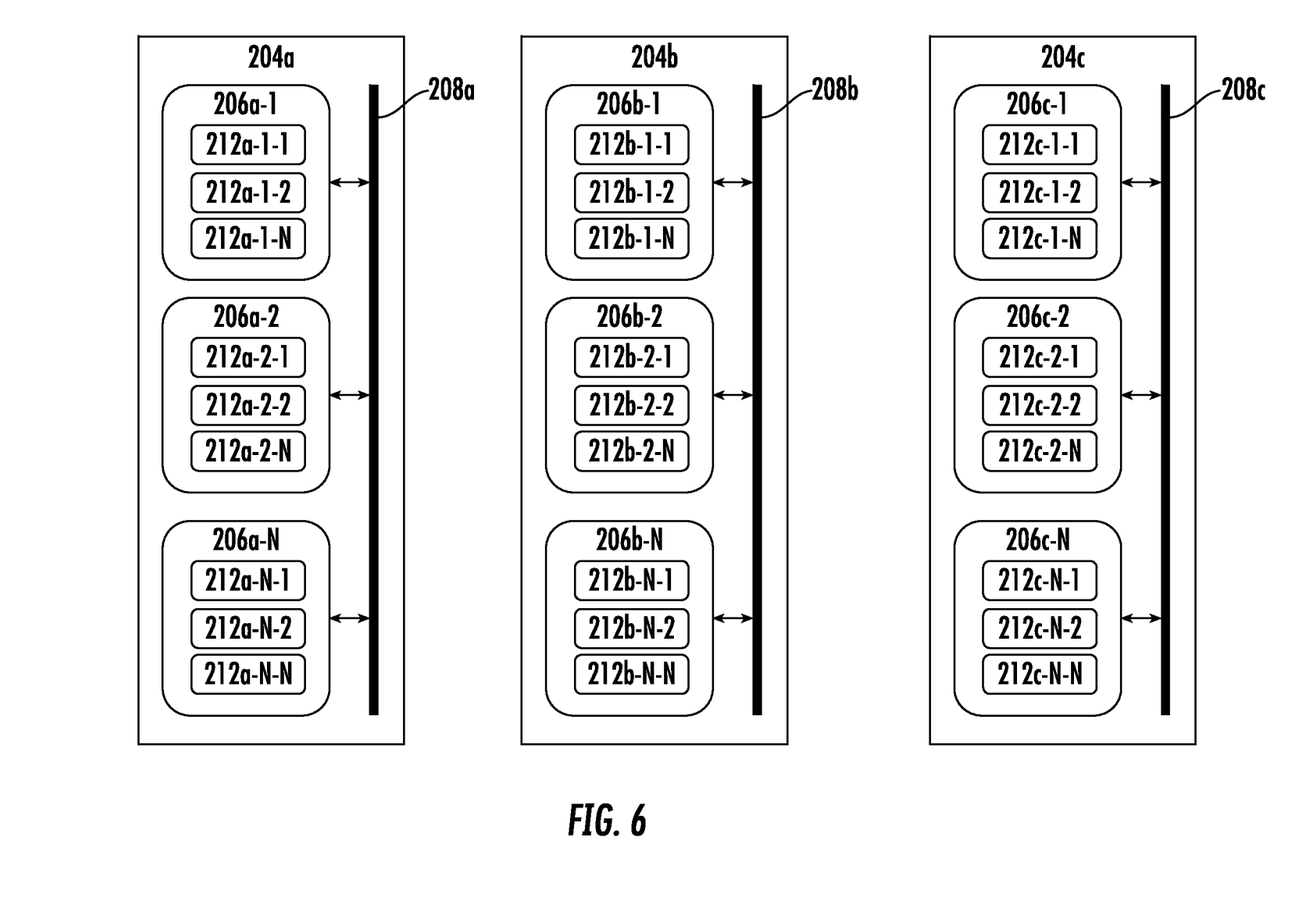
FIG. 6 illustrates a nomenclature for networked cluster nodes, in accordance with some embodiments.

At step 504, the router 203 determines which cluster node 204a-c is associated with the customer 201 and transmits the plurality of events to the first cluster node 204a associated with the at least one customer 201. At step 506, the first cluster node 204a may be associated with the customer 201 and receives the plurality of events based on the customer 201. For example, because the plurality of events is associated with the customer 201, the router 203 automatically transmits the plurality of events to the first cluster node 204a which is associated with the same customer 201. As shown in FIG. 6, the first cluster node 204a is part of the plurality of N cluster nodes 204a-c and has a plurality of services 206 such as a first service 206a-1 with N state machines 212, e.g., a first state machine 212a-1-1, a second state machine 212a-1-2, and N state machine 212a-1-N. The second service 206a-2 has the nomenclature of a first state machine 212a-2-1, a second state machine 212a-2-2, and N state machine 212a-2-N. Following this concept, N service 206a-N has the nomenclature of a first state machine 212a-N-1, a second state machine 212a-N-2, and N state machine 212a-N-N. The services 206 and state machines 212 within the first cluster node 204a communicate by a first internal message bus 208a. The different uses of the "N" designation do not necessarily mean that the same number of elements are indicated, e.g., there are not necessarily the same number of services 206 as there are state machines 212.

Any number of other cluster nodes, such as the second cluster node 204b and the third cluster node 204c, may be networked in the unified communication network system 200. FIG. 6 illustrates the nomenclature for networked cluster nodes, in accordance with some embodiments. Each cluster node 204b-c is similar to the description for the first cluster node 204a and are associated with a customer 201. In some embodiments, the first cluster node 204a is assigned to the customer 201 and the second cluster node 204b is assigned to a different customer 201. In other embodiments, the first cluster node 204a and the second cluster node 204b may be assigned to the same customer 201. This may be due to the number of events typically processed by the unified communication network system 200 or due to the number of users 202 from the customer 201.

At step 508, the first state machine 212a-1-1 generates a current state of the first state machine 212a-1-1 by processing the plurality of events in the order the events are received. The first cluster node 204a and all the cluster nodes in the network, are in communication with the coordinator 214 and the external message bus 216. The coordinator 214 monitors the cluster nodes 204a-c and is in communication with the router 203. At step 510, the first cluster node 204a publishes the plurality of events to a persistent event log 220 (e.g., a log of the events in the order received) via the external message bus 216. In this manner, the events that drive the states of the services 206 are externalized to the persistent external message bus 216 for storage. The persistent event log 220 is a distributed persistent event log of the plurality of events processed by the state machines 212 and associated with the customer 201 and/or the cluster node 204. All of the cluster nodes in the network have access to the persistent event log 220 via the external message bus 216.

In some instances, the first cluster node 204a may fail to communicate with the coordinator 214. This may be due to a software failure, hardware failure, power outage or scheduled maintenance. In other instances, the first cluster node 204a may reach a set capacity of operation such as up to 60%, 80% or 90%. When the coordinator 214 detects one of these situations, at step 512, the second cluster node 204b receives a message from the coordinator 214 directing the second cluster node 204b to subscribe to the persistent event log 220. Subscribing means that the second cluster node 204b accesses and reads the persistent event log 220 for the plurality of events associated with the customer 201 and associated with the first cluster node 204a via the external message bus 216. This enables the work, e.g., processing the plurality of events, to be redistributed to another available node when the first cluster node 204a fails to communicate with the coordinator 214, e.g., is unavailable or goes down or is overwhelmed.

At step 514, the second cluster node 204b subscribes to the persistent event log 220. At step 516, the second cluster node 204b receives from the persistent event log 220, the plurality of events via the external message bus 216. At step 518, a second state machine 212b-1-1 in the second cluster node 204b generates the current state of the first state machine 212a-1-1 in the first cluster node 204a on the second state machine 212b-1-1 in the second cluster node 204b by processing the plurality of events from the persistent event log 220. The plurality of events is processed by the first cluster node 204a in an order received, then the plurality of events is processed by the second cluster node 204b in a same order as by the first cluster node 204a so that the second state machine 212b-1-1 recreates the same state as the first state machine 212a-1-1.

The second cluster node 204b is not merely reading events from a memory and then setting the second state machine 212b-1-1 at the end point of the first state machine 212a-1-1. Instead, the second cluster node 204b processes the plurality of events from the first state machine 212a-1-1 published to the persistent event log 220 by recreating and rerunning the plurality of events on the second state machine 212b-1-1 to arrive at the current state of the first state machine 212a-1-1 when the first cluster node 204a failed to communicate with the coordinator 214 or the coordinator 214 otherwise determined that the second cluster node 204b needed to take over events (or a portion thereof) from the customer 201. In other words, it recreates or rebuilds the current state of the first state machine 212a-1-1 on the second state machine 212b-1-1 instead of reloading the last event. This recreation of the current state occurs within a time frame typically unnoticeable by a human user, which enables the second cluster node 204b to seamlessly and quickly take over for the first cluster node 204a without degradation in the service and undetected by the customer 201 or the user 202. For example, if the first cluster node 204a inadvertently fails during a session with the customer 201 or user 202, by performing the steps in the telecommunication method 500, the session is picked up at the exact point of failure and is able to continue without interruption and provide the correct service to the customer 201 or user 202. In contrast, in conventional systems, if a node fails in the middle of a session, the session is redirected to another node and that node restarts and creates a new session. In conventional systems, the new node has no way to determine what point the session is at and can't rebuild the session to the point of failure to seamlessly continue the session.

When the second cluster node 204b takes over for the first cluster node 204a, the second cluster node 204b is now associated with the customer 201 that was once associated with first cluster node 204a. In some cases, the first cluster node 204a no longer exists. The coordinator 214, which is in communication with the cluster nodes, becomes aware of and keeps track of the change. The coordinator 214 is also in communication with the router 203 and informs the router 203 of the new arrangement in the association of the customer 201 and the cluster nodes 204a-b. Therefore, when the router 203 receives the plurality of events from the particular customer 201 once associated with first cluster node 204a, the router 203 transmits the plurality of events to the new, correct second cluster node 204b, now associated with that customer 201.

Figure 7:
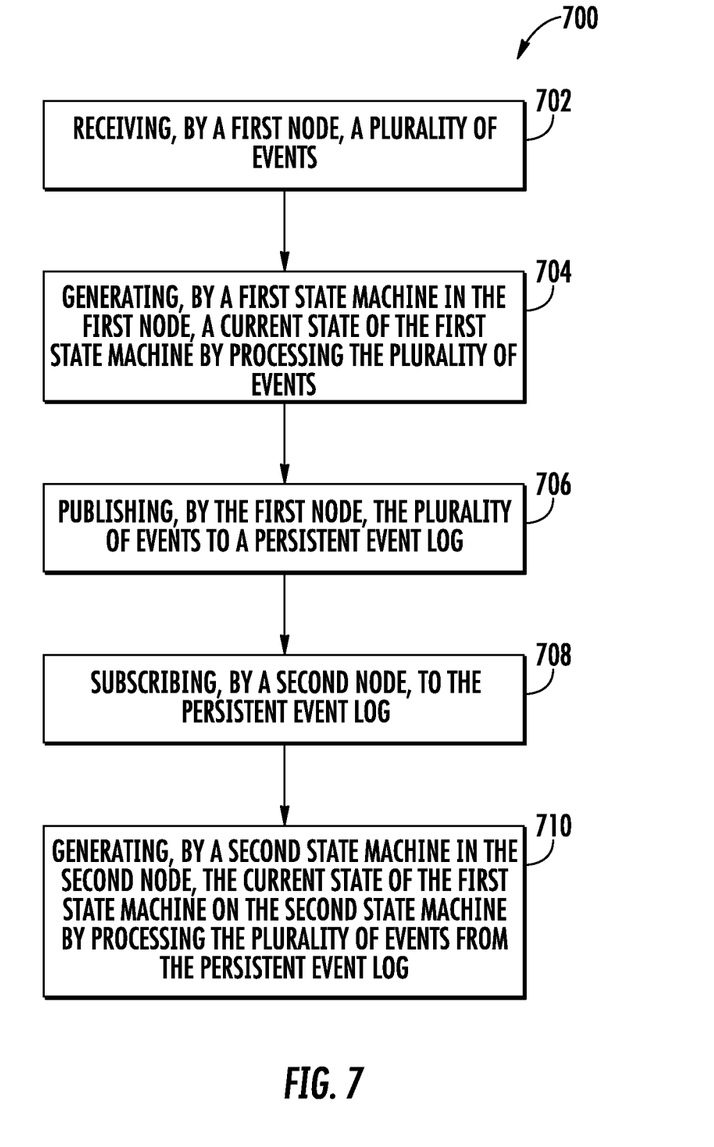
FIG. 7 is a method for the unified communication network system with a broader scope of the method for a telecommunication system detailed in FIG. 5, in accordance with some embodiments.

FIG. 7 is a method for the unified communication network system 200 with a broader scope of the method 500 for a telecommunication system detailed in FIG. 5, in accordance with some embodiments. At step 702, the first node receives the plurality of events. At step 704, the first state machine in the first node generates a current state of the first state machine by processing the plurality of events. The plurality of events is processed by the first node in an order as received. At step 706, the first node publishes the plurality of events to a persistent event log. At step 708, the second node subscribes to the persistent event log. At step 710, the second state machine in the second node generates the current state of the first state machine on the second state machine by processing the plurality of events from the persistent event log. The plurality of events is processed by the second node in a same order as by the first node so that the second state machine recreates the same state as the first state machine.

In some embodiments, the persistent event log 220 is only subscribed to or accessed when necessary, such as when a cluster node is taking over for another cluster node. Because of the robustness of the unified communication network system 200, the second cluster node 204b only needs to subscribe to the persistent event log 220 when the first cluster node 204a fails to communicate or reaches a set capacity. This occurs infrequently, having a low volume effect on the unified communication network system 200. The external message bus 216 is used in an optimal way as a persistent log or storage through the persistent event log 220. The external message bus 216 also enables of the function of publishing the plurality of events and subscribing to the plurality of events.

In some embodiments, when the second cluster node 204b subscribes to the persistent event log 220, the second cluster node 204b only looks at the data or plurality of events from the particular customer 201 associated with the first cluster node 204a, not everything in the persistent event log 220. Additionally, in some embodiments, the second cluster node 204b only reads the events for the users 202 who are currently actively engaged in a communication session. Events for inactive, completed or terminated communication sessions are ignored by the second cluster node 204b or deleted by the persistent event log 220 or the external message bus 216. In this way, not all of the data in the persistent event log 220 needs to be read or processed, but only the plurality of events associated with the particular customer 201. This makes the process quick and efficient while saving valuable resources and time.

In a non-limiting example, the first cluster node 204a receives an event associated with the customer 201, which is a mobile call session to a call center. The customer is connected to an agent (e.g., a user 202 of the customer 201) of a plurality of agents, while the other agents are inactive. During the call, scheduled maintenance of the first cluster node 204a suddenly occurs and the first cluster node 204a fails to communicate with the coordinator 214 and the first cluster node 204a goes away. In conventional systems, this results in the risk of the call between the customer 201 and agent being lost or dropped, the session is lost, and the customer 201 would call in again and start over. However, by using the system and method of the present application, as soon as the first cluster node 204a goes away, the coordinator 214 sends a message to the second cluster node 204b, and the second cluster node 204b takes over by subscribing to the persistent event log 220. The second cluster node 204b subscribes only to the portion of the persistent event log 220 associated with the customer 201 for the event, e.g., the customer the agent is on the call session with, who is also associated with the first cluster node 204a.

Then, the second state machine 212b-1-1 in the second cluster node 204b generates the current state of the first state machine 212a-1-1 on the second state machine 212b-1-1 by processing the plurality of events from the persistent event log 220 for the call session or for the agent. Because the other agents are inactive, any other state machines 212 (e.g., associated with the other agents) in the first cluster node 204a don't need to be recreated in the second cluster node 204b. While the current state of the first state machine 212a-1-1 is recreated on the second state machine 212b-1-1, which occurs in microseconds, the call between the customer 201 and agent is still connected and live. Once the current state of the first state machine 212a-1-1 is recreated on the second state machine 212b-1-1, again occurring in microseconds, the call is right where it left off, or in its current state. No data is lost and the call can continue seamlessly and uninterrupted to the customer 201.

In conventional systems, there may be a distributed cache acting as a memory storage means for the events and accessible by all of the nodes. Issues may arise with contention because, at the same time, multiple nodes may access the distributed cache to read while other nodes are writing to the distributed cache. Locks may be used to lock out nodes or the distributed cache, so that nodes can't read from the distributed cache while another node is writing to the distributed cache. This may cause time delays and interruption in service to the customer. Moreover, the events are not categorized in the distributed cache in any meaningful way; therefore, if the node needs to access information in the distributed cache, all the events are read which is time consuming and resource wasteful.

In some embodiments, premium features of the system or method may be available for a fee or as a perk for regular or high priority customers 201. For example, the customer 201 may be associated with and assigned to their own cluster node 204 as opposed to sharing the cluster node with other customers 201. In this way, the integrity of the cluster node 204 is increased by processing less events. In another scenario referred to as N+2 clustering, a duplicate of the entire first cluster node 204a is created in case of a failure of the first cluster node 204a. For example, the second cluster node 204b subscribes to the persistent event log 220 while the first cluster node 204a is processing the plurality of events even if the first cluster node 204a is still in communication with the coordinator 214. The second state machine 212b-1-1 in the second cluster node 204b generates on the second state machine 212b-1-1 in the second cluster node 204b, the current state of the first state machine 212a-1-1 in the first cluster node 204a by processing the plurality of events in the order received from the persistent event log 220. This is repeated for all the plurality of events in the first cluster node 204a. In this way, a duplicate or mirror image of the entire first cluster node 204a is created on the second cluster node 204b in real-time with a very minor time difference between the two. Therefore, if the first cluster node 204a fails to communicate with the coordinator 214 or is reaching the set capacity, the second cluster node 204b with the duplicate copy of the first cluster node 204a is ready to directly take over for the for the first cluster node 204*a* and all of the state machines 212*b*-N-N in the second cluster node 204*b* are at the current state of the state machines 212*a*-N-N in the first cluster node 204*a*.

In the network of cluster nodes, it's possible to run different revisions of the same software on the cluster nodes at the same time. For example, the first cluster node 204*a* may operate using a revision of software such as version 1.0 and the second cluster node 204*b* may operate using a different revision of the same software, such as version 2.0. The first cluster node 204*a* and the second cluster node 204*b* operate at the same time in the system or network of cluster nodes. This is an advantage in the design of the unified communication network system 200 where the customer 201 is associated with a particular cluster node. In this way, the customer 201 can choose to use the past revision of the software, because of perhaps the comfort level and familiarity of the performance characteristics of that version of software, while another customer 201 is not stuck with the older version of the software and can instead, use the latest revision of software. Moreover, customers 201 can be upgraded to the latest software revision on separate schedules. If the customer 201 is using the past version of the software, the migration to the newer revision of software is easy, fast and efficient by simply changing to a new cluster node using the newer revision of software by implementing aspects of method 500 or method 700. Additionally, if another cluster node needs to take over the servicing of events for the first cluster node 204*a*, then a third cluster node (e.g., 204*c*) can be instantiated to run the same revision of the software as that of the first cluster node 204*a*, so that the above described methods 500 and/or 700 can be performed regardless of the revision of the software used by the customer 201. Furthermore, a customer 201 using a legacy stateful system cluster node configuration can be readily upgraded for increased capacity by simply duplicating the legacy system cluster node, regardless of the revision of software being operated, and adding the above-described capabilities of the coordinator 214, the external message bus 216, the persistent event log 220, and the router 203. In this manner, the legacy stateful system cluster node is considered a reference software system, of which any number (N) of instances can be run, each of which is a single application similar to the original reference, and all of which provide N times the original capacity.

Furthermore, because the plurality of events is routed to a particular cluster node based on the customer 201, the cluster nodes have the appropriate resources to handle the event. In contrast, in a conventional system, the events are routed at the message level instead of the customer level and any node processes the event. Therefore, all of the nodes need to be using the same version of software to ensure the receiving node can handle the event by providing the correct resource. Otherwise, the system would need to keep track of what version of software is running on which nodes, what version of software is required to process the event, and manage the integrity of the system. This puts strain on the network and server structure.

Figure 8:
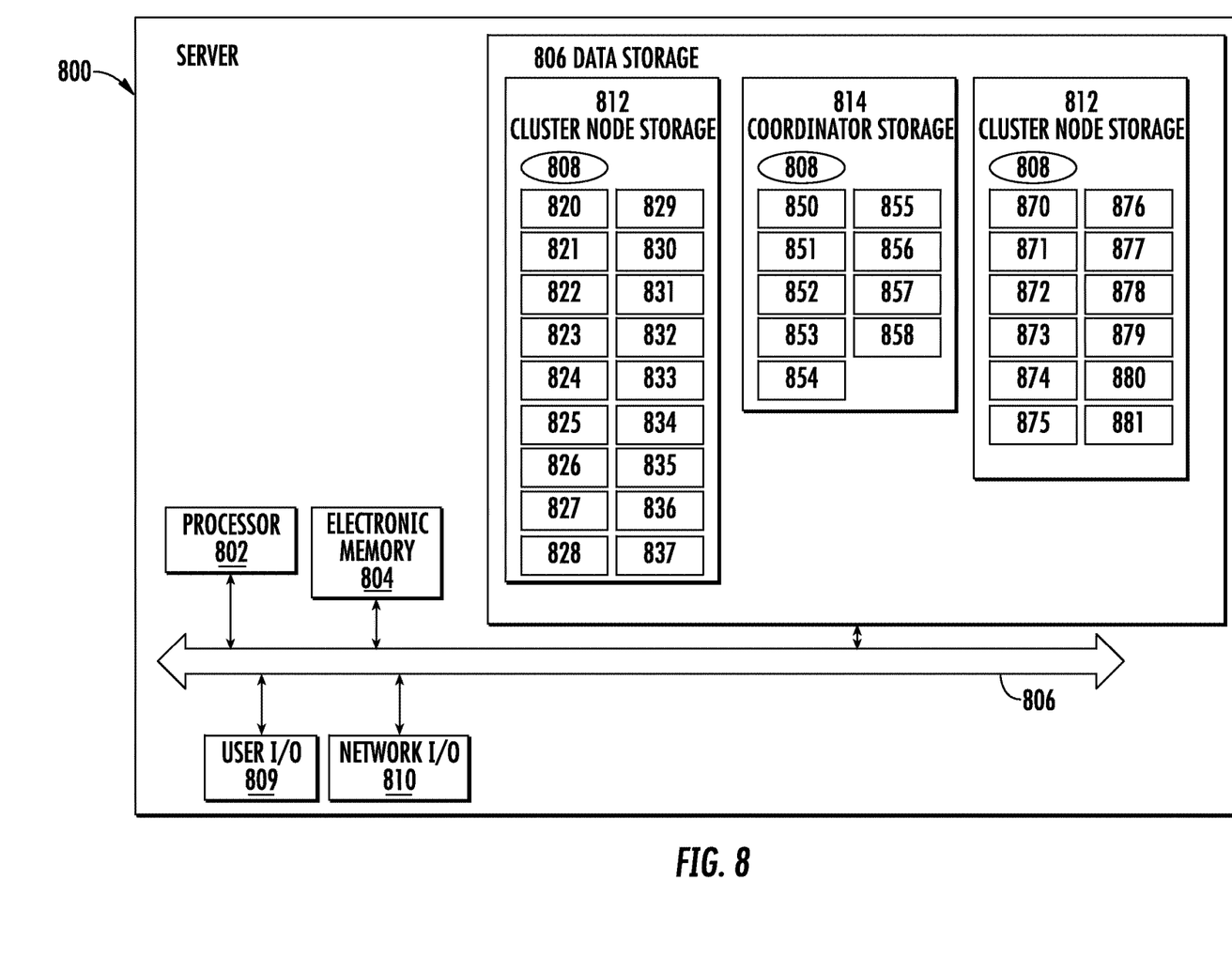
FIG. 8 is a simplified schematic diagram showing an example server for use in the unified communication network system, in accordance with some embodiments.

A simplified schematic diagram showing an example server 800 (representing any combination of one or more of the servers) for use in the unified communication network system 200 is shown in FIG. 8, in accordance with some embodiments. Other embodiments may use other components and combinations of components. For example, the server 800 may represent one or more physical computer devices or servers, such as web servers, rack-mounted computers, network storage devices, desktop computers, laptop/notebook computers, etc., depending on the complexity of the unified communication network system 200. In some embodiments implemented at least partially in a cloud network potentially with data synchronized across multiple geolocations, the server 800 may be referred to as one or more cloud servers. In some embodiments, the functions of the server 800 are enabled in a single computer device. In more complex implementations, some of the functions of the computing system are distributed across multiple computer devices, whether within a single server farm facility or multiple physical locations. In some embodiments, the server 800 functions as a single virtual machine.

In some embodiments wherein the server 800 represents multiple computer devices, some of the functions of the server 800 are implemented in some of the computer devices, while other functions are implemented in other computer devices. For example, various portions of the cluster nodes 204, the coordinator 214, and the external message bus 216 can be implemented on the same computer device or separate computer devices. In the illustrated embodiment, the server 800 generally includes at least one processor 802, a main electronic memory 804, a data storage 806, a user I/O 808, and a network I/O 810, among other components not shown for simplicity, connected or coupled together by a data communication subsystem 806.

The processor 802 represents one or more central processing units on one or more PCBs (printed circuit boards) in one or more housings or enclosures. In some embodiments, the processor 802 represents multiple microprocessor units in multiple computer devices at multiple physical locations interconnected by one or more data channels, such as the communication access systems 108-113. When executing computer-executable instructions for performing the above described functions of the server 800 in cooperation with the main electronic memory 804, the processor 802 becomes a special purpose computer for performing the functions of the instructions.

The main electronic memory 804 represents one or more RAM modules on one or more PCBs in one or more housings or enclosures. In some embodiments, the main electronic memory 804 represents multiple memory module units in multiple computer devices at multiple physical locations. In operation with the processor 802, the main electronic memory 802 stores the computer-executable instructions executed by, and data processed by, the processor 802 to perform the above described functions of the server 800.

The data storage 806 represents or comprises any appropriate number or combination of internal or external physical mass storage devices, such as hard drives, optical drives, network-attached storage (NAS) devices, flash drives, etc. In some embodiments, the data storage 806 represents multiple mass storage devices in multiple computer devices at multiple physical locations. The data storage 806 generally provides persistent storage (e.g., in a non-transitory computer-readable or machine-readable medium 809) for the programs (e.g., computer-executable instructions) and data used in operation of the processor 802 and the main electronic memory 804.

In some embodiments, there are areas of data storage 806 such as cluster node storage 812, coordinator storage 814 and external message bus storage 816. The cluster node storage 812 may include, but not limited to, a receiver 820 for receiving an event or information from within the node, the router 203 or coordinator 214; a transmitter 821 for transmitting information within the node or external to the node, such as to the router 203, coordinator 214 or external message bus 216; an in-memory message bus 822 (e.g., for the internal message bus 208 and/or the external message bus 216) for internal communication within the node or to the router 203 or coordinator 214; a data and command program 823 for general operations of the cluster nodes 204; an event scheduler 824 for coordinating the scheduling of the event; one or more service modules 825 for operation of the services 206; one or more state machine modules 826 for operation of the state machines 212; historical data 827 of previous events; one or more parsing routines 828 for parsing data; a searching routine 829 for searching through the various types of information; a subscribing routine 830 for subscribing to events and information in the persistent event log 220; a reading routine 831 for reading events and information from the data storage 806 into the main electronic memory 804; a publishing routine 832 for publishing events and information to the persistent event log 220; a storing routine 833 for storing events and information from the main electronic memory 804 to the data storage 806; a network communication services program 834 for sending and receiving network communication packets through the communication access systems 108-113; a notification service program 835 for contacting customers; a gateway services program 836 for serving as a gateway to communicate information between servers and customers; and one or more states 837 encapsulated in the various state machines 212; among other programs and data. Under control of these programs and using this data, the processor 802, in cooperation with the main electronic memory 804, performs the above described functions for the server 800 to function as the cluster nodes 204.

The coordinator storage 814 may include, but not limited to, a receiver 850 for receiving information from the nodes 204 or router 203; a transmitter 851 for transmitting information to the nodes 204 or router 203; a data and command program 852 for general operations of the coordinator 214; a service module 853 for communicating with operations of the services 206; historical data 854 of previous events; one or more parsing routines 855 for parsing data; a searching routine 856 for searching through the various types of information; a reading routine 857 for reading events and information from the data storage 806 into the main electronic memory 804; and a storing routine 858 for storing events and information from the main electronic memory 804 to the data storage 806; among other programs and data. Under control of these programs and using this data, the processor 802, in cooperation with the main electronic memory 804, performs the above described functions for the server 800 to function as the coordinator 214.

The external message bus storage 816 may include, but not limited to, a receiver 870 for receiving information from the nodes 204; a transmitter 871 for transmitting information to the nodes 204; a bus 872 for communication; a data and command program 873 for general operations of the external message bus 216; an persistent event log module 874 for managing the persistent event log 220; one or more parsing routines 875 for parsing data; a searching routine 876 for searching through the various types of information; a subscribing routine 877 for subscribing to events and information from the cluster nodes 204; a reading routine 878 for reading events and information from the persistent event log 220 from the data storage 806 into the main electronic memory 804, a publishing routine 879 for publishing events and information and responding to subscriber requests from the cluster nodes 204; a storing routine 880 for storing events and information from the main electronic memory 804 to the data storage 806; and a network communication services program 881 for sending and receiving network communication packets; among other programs and data. Under control of these programs and using this data, the processor 802, in cooperation with the main electronic memory 804, performs the above described functions for the server 800 to function as the external message bus 216 and the persistent event log 220.

The user I/O 809 represents one or more appropriate user interface devices, such as keyboards, pointing devices, displays, etc. In some embodiments, the user I/O 809 represents multiple user interface devices for multiple computer devices at multiple physical locations. A system administrator, for example, may use these devices to access, setup and control the server 800.

The network I/O 810 represents any appropriate networking devices, such as network adapters, etc. for communicating through the communication access systems 108-113. In some embodiments, the network I/O 810 represents multiple such networking devices for multiple computer devices at multiple physical locations for communicating through multiple data channels.

The data communication subsystem 806 represents any appropriate communication hardware for connecting the other components in a single unit or in a distributed manner on one or more PCBs, within one or more housings or enclosures, within one or more rack assemblies, within one or more geographical locations, etc.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or an assembly/machine language. As used herein, the term "machine-readable medium" (i.e., non-transitory computer-readable media) refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a machine-readable medium. The machine-readable medium can store such machine instructions non-transitorily, such as for example as would a non-transient solid-state memory or a magnetic hard drive or any similar storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor, for displaying information to the user and a keyboard and a pointing device, such as for example a mouse, a touchpad or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one" or "one or more" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method for telecommunications comprising:
   receiving, by a first node, a plurality of events for a communications session associated with a particular user;
   generating, by a first state machine in the first node, a current state of the first state machine for the communications session associated with the particular user by processing the plurality of events in the order the events are received;
   publishing, by the first node, the plurality of events associated with the particular user and the order in which the events are received to a persistent event log;
   receiving, by a second node, a message directing the second node to subscribe to the persistent event log;
   subscribing, by the second node, to the persistent event log in response to the message; and
   generating, by a second state machine in the second node, the current state of the first state machine on the second state machine by processing the plurality of events for the communications session associated with the particular user from the persistent event log by rerunning the plurality of events on the second state machine in the same order as by the first cluster node to recreate or rebuild the current state of the first state machine to continue the communication session associated with the particular user.

2. The method of claim 1, wherein the plurality of events is for a communication service including at least one of an instant message, presence information, voice features, mobility features, audio features, web and video conferencing, calendaring, fixed-mobile convergence, desktop sharing, data sharing, call control, speech recognition, unified messaging, integrated voicemail, e-mail, SMS or fax.

3. The method of claim 1, wherein the first node is associated with at least one customer.

4. The method of claim 3, further comprising:
   receiving, by a router, the plurality of events from the at least one customer, the plurality of events being associated with the at least one customer; and
   transmitting, by the router, the plurality of events to the first node associated with the at least one customer.

5. The method of claim 1, wherein the processing the plurality of events from the persistent event log is associated with a customer.

6. The method of claim 1, wherein the first node and the second node are part of a cluster of nodes and communicate with a coordinator and an external message bus, the external message bus having the persistent event log.

7. The method of claim 1, further comprising:
   receiving, by the second node from a coordinator, the message directing the second node to subscribe to the persistent event log.

8. The method of claim 1, wherein the second node subscribes to the persistent event log when the first node fails to communicate with a coordinator or when the first node reaches a set capacity.

9. The method of claim 1, wherein the first node operates using a revision of software and the second node operates using a different revision of the same software, the first node and the second node operating at the same time.

10. A system for telecommunications comprising:
    a router configured to receive a plurality of events for a communication session, the plurality of events being associated with a customer;

a plurality of cluster nodes, a first cluster node of the plurality of cluster nodes being associated with the customer, having a first state machine and an internal message bus, and being configured to:
i) receive the plurality of events from the router based on the customer;
ii) generate, by the first state machine, a current state of the first state machine for the communications session associated with the customer by processing the plurality of events in the order the events are received;
iii) publish, by the first cluster node, the plurality of events associated with the particular user and the order in which the events are received to a persistent event log;
an external message bus in communication with the plurality of cluster nodes and having the persistent event log; and
a coordinator in communication with the plurality of cluster nodes and configured to transmit a message to a second cluster node of the plurality of cluster nodes;
wherein when the second cluster node receives the message from the coordinator, the second cluster node subscribes to the persistent event log via the external message bus and generates the current state of the first state machine on a second state machine by processing the plurality of events for the communications session associated with the customer from the persistent event log by rerunning the plurality of events on the second state machine in the same order as by the first cluster node to recreate or rebuild the current state of the first state machine to continue the communications session associated with the particular user.

11. The system of claim 10, wherein the plurality of events is for a communication service including at least one of an instant message, presence information, voice features, mobility features, audio features, web and video conferencing, calendaring, fixed-mobile convergence, desktop sharing, data sharing, call control, speech recognition, unified messaging, integrated voicemail, e-mail, SMS or fax.

12. The system of claim 10, wherein the first node of the cluster of nodes operates using a revision of software and the second node of the cluster of nodes operates using a different revision of the same software, the first node and the second node operating at the same time in the cluster of nodes of the system.

13. The system of claim 10, wherein the coordinator transmits the message to the second node when the first node fails to communicate with the coordinator or when the first node reaches a set capacity.

14. The system of claim 10, wherein the processing the plurality of events from the persistent event log is associated with the customer.

15. A method for telecommunications comprising:
receiving, by a router, a plurality of events for a communication session, the plurality of events being associated with a customer;
transmitting, by the router, the plurality of events;
receiving, by a first node associated with the customer, the plurality of events based on the customer, the first node being part of a plurality of cluster nodes, and having a first state machine and an internal message bus;
generating, by the first state machine, a current state of the first state machine for the communications session associated with the customer by processing the plurality of events in the order the events are received;
publishing, by the first node, the plurality of events associated with the particular user and the order in which the events are received to a persistent event log;
receiving, by a second node, a message directing the second node to subscribe to the persistent event log;
subscribing, by the second node, to the persistent event log;
receiving, by the second node from the persistent event log, the plurality of events; and
generating, by a second state machine in the second node, the current state of the first state machine on the second state machine by processing the plurality of events for the communications session associated with the customer from the persistent event log by rerunning the plurality of events on the second state machine in the same order as by the first cluster node to recreate or rebuild the current state of the first state machine to continue the communications session associated with the particular user.

16. The method of claim 15, wherein the first node of the cluster of nodes operates using a revision of software and the second node of the cluster of nodes operates using a different revision of the same software, the first node and the second node operating at the same time in the cluster of nodes.

17. The method of claim 15, wherein a coordinator transmits the message to the second node when the first node fails to communicate with the coordinator or when the first node reaches a set capacity.

18. The method of claim 15, further comprising:
subscribing, by the second node, to the persistent event log while the first node is processing the plurality of events;
generating, by the second state machine in the second node, on the second state machine in the second node, the current state of the first state machine in the first node by processing the plurality of events from the persistent event log;
wherein a duplicate of an entire first node is created in case of a failure of the first node.

* * * * *